(12) United States Patent
Sanderson

(10) Patent No.: US 9,894,879 B2
(45) Date of Patent: Feb. 20, 2018

(54) FLUID DISPENSING BOTTLE

(71) Applicant: Brian M. Sanderson, Hurricane, UT (US)

(72) Inventor: Brian M. Sanderson, Hurricane, UT (US)

( * ) Notice: Subject to any disclaimer, the term of this patent is extended or adjusted under 35 U.S.C. 154(b) by 0 days.

(21) Appl. No.: 14/692,462

(22) Filed: Apr. 21, 2015

(65) Prior Publication Data

US 2015/0298867 A1 Oct. 22, 2015

Related U.S. Application Data

(60) Provisional application No. 61/982,238, filed on Apr. 21, 2014.

(51) Int. Cl.

| | | |
|---|---|---|
| *B65D 81/32* | (2006.01) | |
| *A01K 7/00* | (2006.01) | |
| *B65D 47/26* | (2006.01) | |
| *A47G 19/22* | (2006.01) | |
| *B65D 1/24* | (2006.01) | |
| *B65D 1/36* | (2006.01) | |
| *B65D 25/04* | (2006.01) | |
| *B65D 57/00* | (2006.01) | |
| *B65D 85/00* | (2006.01) | |

(52) U.S. Cl.
CPC ............ *A01K 7/00* (2013.01); *A47G 19/2266* (2013.01)

(58) Field of Classification Search
CPC ............ B65D 81/3244; B65D 81/3272; B65D 47/268; A01K 7/00
USPC ........................................................ 220/504
See application file for complete search history.

(56) References Cited

U.S. PATENT DOCUMENTS

| | | | | |
|---|---|---|---|---|
| 5,477,994 | A * | 12/1995 | Feer ...................... | B65D 47/305 137/846 |
| 5,738,039 | A * | 4/1998 | Berman ................... | A01K 7/04 119/72 |
| 6,142,325 | A * | 11/2000 | Chomik .................... | A61J 9/04 215/341 |
| 6,523,711 | B1 * | 2/2003 | Hughes .............. | A47G 19/2266 215/308 |
| 6,971,551 | B2 * | 12/2005 | Widgery ............ | A47G 19/2266 222/129 |
| 7,690,329 | B2 | 4/2010 | Parks | |
| 8,365,941 | B2 | 2/2013 | Mayer | |
| 2007/0017452 | A1 | 1/2007 | Hurwitz et al. | |
| 2007/0181520 | A1* | 8/2007 | Holley, Jr. ................. | A61J 9/04 215/11.1 |

(Continued)

*Primary Examiner* — Andrew T Kirsch
(74) *Attorney, Agent, or Firm* — Sumsion Business Law

(57) ABSTRACT

A bottle, including a bottle body having a bottom aperture through a bottom end thereof and a top aperture through a top end thereof opposite the bottom end; a top valve assembly that extends through the top end of the bottle body and allows for selectable dispensing of fluid disposed within the bottle body out therethrough; a flexibly invertible dish coupled about the bottom aperture, wherein in a stored mode the dish is coupled about an outer surface of the bottle body and in a deployed mode the dish is inverted with respect to itself in the stored mode and extends outwardly from the bottom end of the bottle body forming a concave surface within which fluid may be disposed; and a bottom valve assembly that may extend through the bottom end of the bottle body and allows for selectable dispensing of fluid disposed within the bottle body out therethrough.

20 Claims, 13 Drawing Sheets

(56) References Cited

U.S. PATENT DOCUMENTS

2010/0075001 A1* 3/2010 Succar ............... B65D 47/2018
　　　　　　　　　　　　　　　　　　　　　　　426/115
2010/0078436 A1* 4/2010 Winchell ................. B65D 1/04
　　　　　　　　　　　　　　　　　　　　　　　220/504

* cited by examiner

FLUID DISPENSING BOTTLE

CROSS-REFERENCE TO RELATED APPLICATIONS

This invention claims priority, under 35 U.S.C. § 120, to the U.S. Provisional Patent Application No. 61/982,238 to Sanderson filed on Apr. 21, 2014, which is incorporated by reference herein in its entirety.

BACKGROUND OF THE INVENTION

Field of the Invention

The present invention relates to bottles, specifically to bottles for dispensing fluids.

Description of the Related Art

In the related art, it has been known to use bottles to dispense fluids, such as but not limited to drinking water. Some improvements have been made in the field. Examples of references related to the present invention are listed below and the supporting teachings of each reference are incorporated by reference herein: U.S. Pat. No. 7,690,329 to Parks; and U.S. Pat. No. 8,365,941 to Mayer, and U.S. Patent Application Publication No. 20070017452, by Hurwitz et al.

The inventions heretofore known suffer from a number of disadvantages which may include one or more of not being convenient, being dirty or prone to getting dirty, not being safe, requiring too much time to operate, not having multiple configurations, only holding a single fluid, requiring separate or disparate devices, being too heavy, being bulky, not being compact, not being machine-washable, not being environmentally friendly, being difficult to use, of being intuitive, failing to fit existing mounts (e.g. bike mounts for hydration bottles), not being durable, not being ergonomic for humans, not being ergonomic for pets, and being expensive.

What is needed is a bottle that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available bottles Accordingly, the present invention has been developed to provide a bottle.

There may be a bottle, that may include one or more of a bottle body that may have a bottom aperture through a bottom end thereof and/or a top aperture through a top end thereof opposite the bottom end; a top valve assembly that may extend through the top end of the bottle body and/or may allow for selectable dispensing of fluid disposed within the bottle body out therethrough; a flexibly invertible dish coupled near the bottom aperture, wherein in a stored mode the dish may be coupled about an outer surface of the bottle body and/or in a deployed mode the dish may be inverted with respect to itself in the stored mode and/or may extend outwardly from the bottom end of the bottle body forming a concave surface within which fluid may be disposed; and/or a bottom valve assembly that may extend through the bottom end of the bottle body and/or may allow for selectable dispensing of fluid disposed within the bottle body out therethrough.

A top valve assembly may include a selectably removable cap that may selectably couple to and/or covers the top aperture; a one-way air intake valve that may permit air to enter the bottle body but not to exit therefrom; a first multi-position fluid valve that may include a first mode wherein fluid flow therethrough is restricted, a second mode wherein fluid flow through the top is permitted, and/or a third mode wherein fluid flow through the top straw is permitted; and/or a top straw that may be coupled to the top valve assembly and/or may extend downwardly therefrom in an interior of the bottle body and/or may have an offset thereto;

A bottom valve assembly may include a selectably removable cap that may selectably couple to and/or cover the bottom aperture; a back-flow prevention valve; a second multi-position fluid valve that may include a first mode wherein fluid flow therethrough is restricted and/or a second mode wherein fluid flow through the bottom is permitted; and/or a bottom straw that may be coupled to the bottom valve assembly and/or may extend upwardly therefrom in an interior of the bottle body.

There may be a fluid-impermeable membrane/bladder disposed within the bottle body that forms a barrier between the top valve assembly and the bottom valve assembly and prevents fluid communication therebetween.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
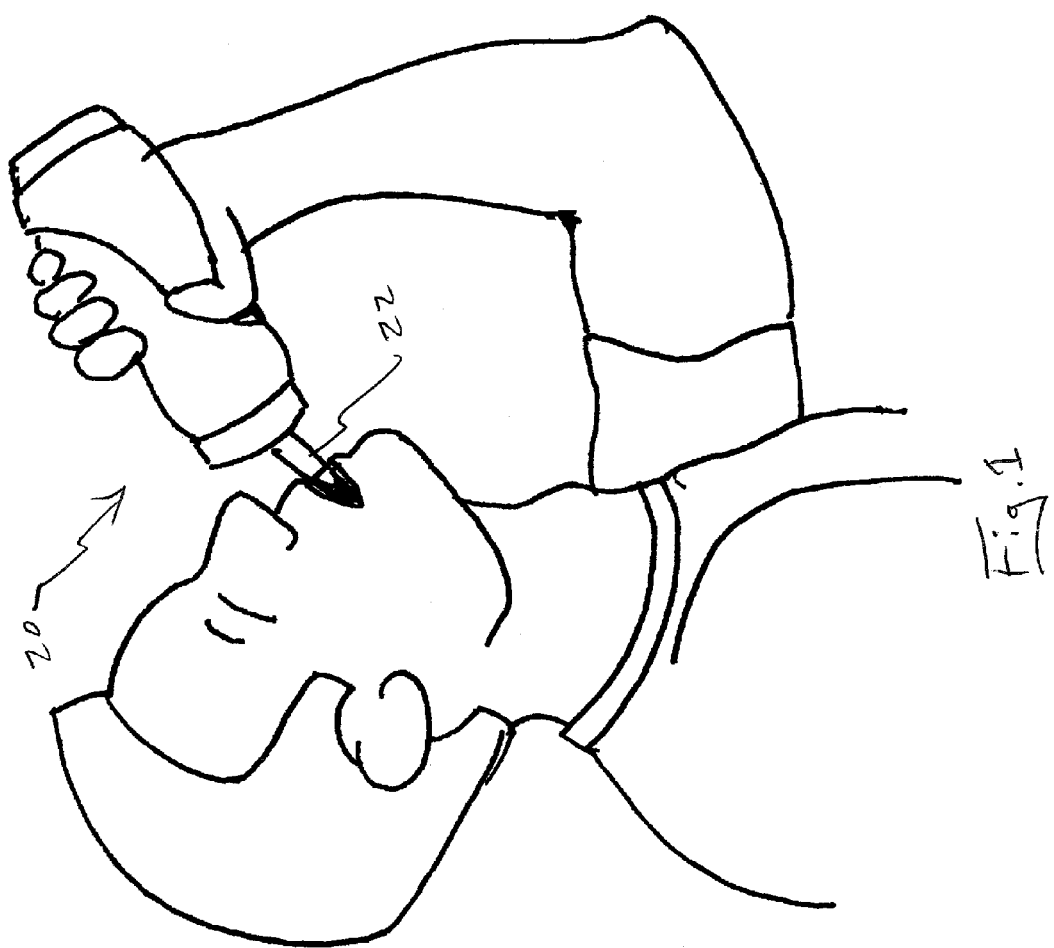
FIG. 1 illustrates a human drinking from a bottle, according to one embodiment of the invention.
Figure 2:
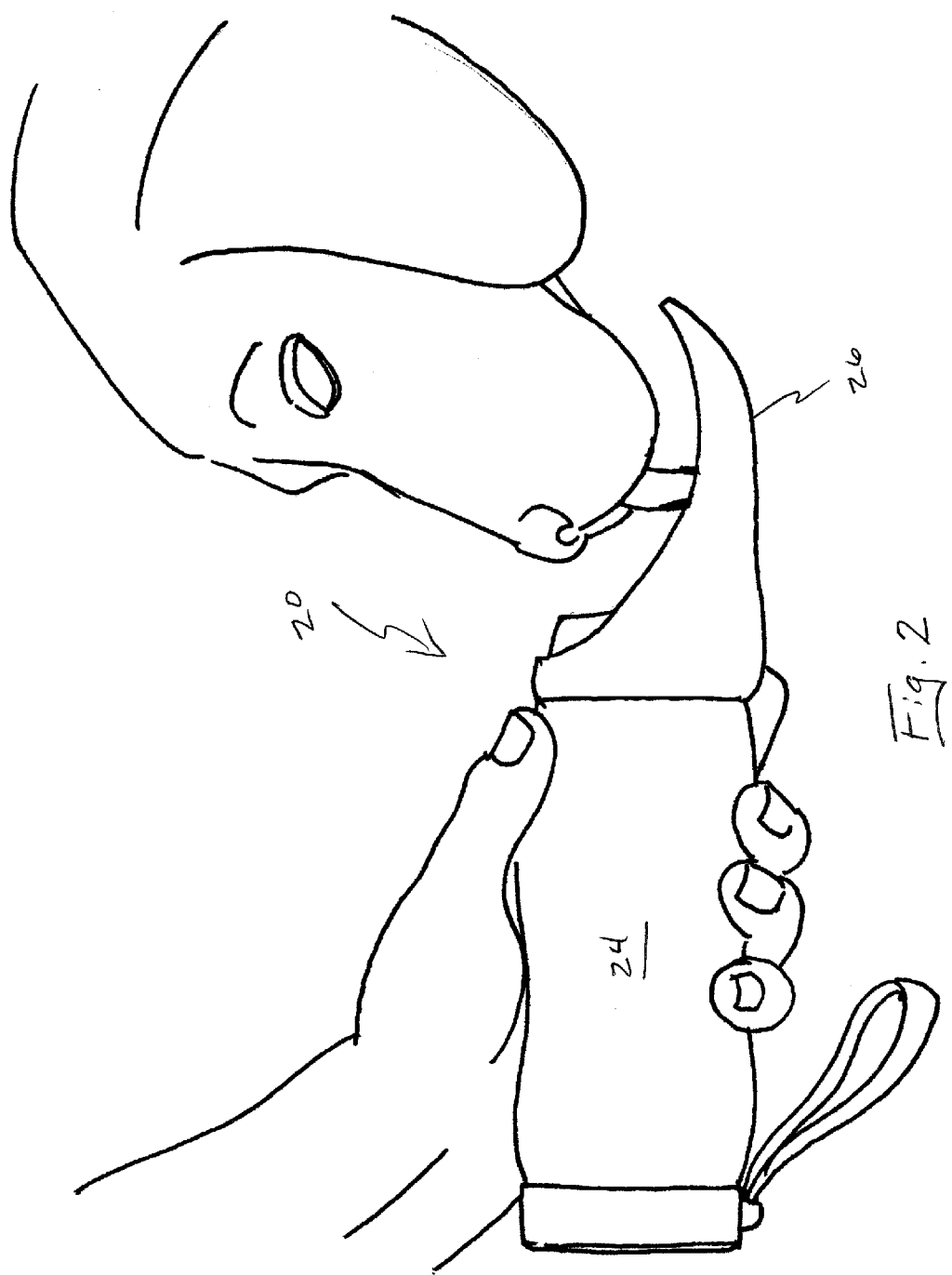
FIG. 2 illustrates a dog drinking from a bottle, according to one embodiment of the invention.
Figure 3:
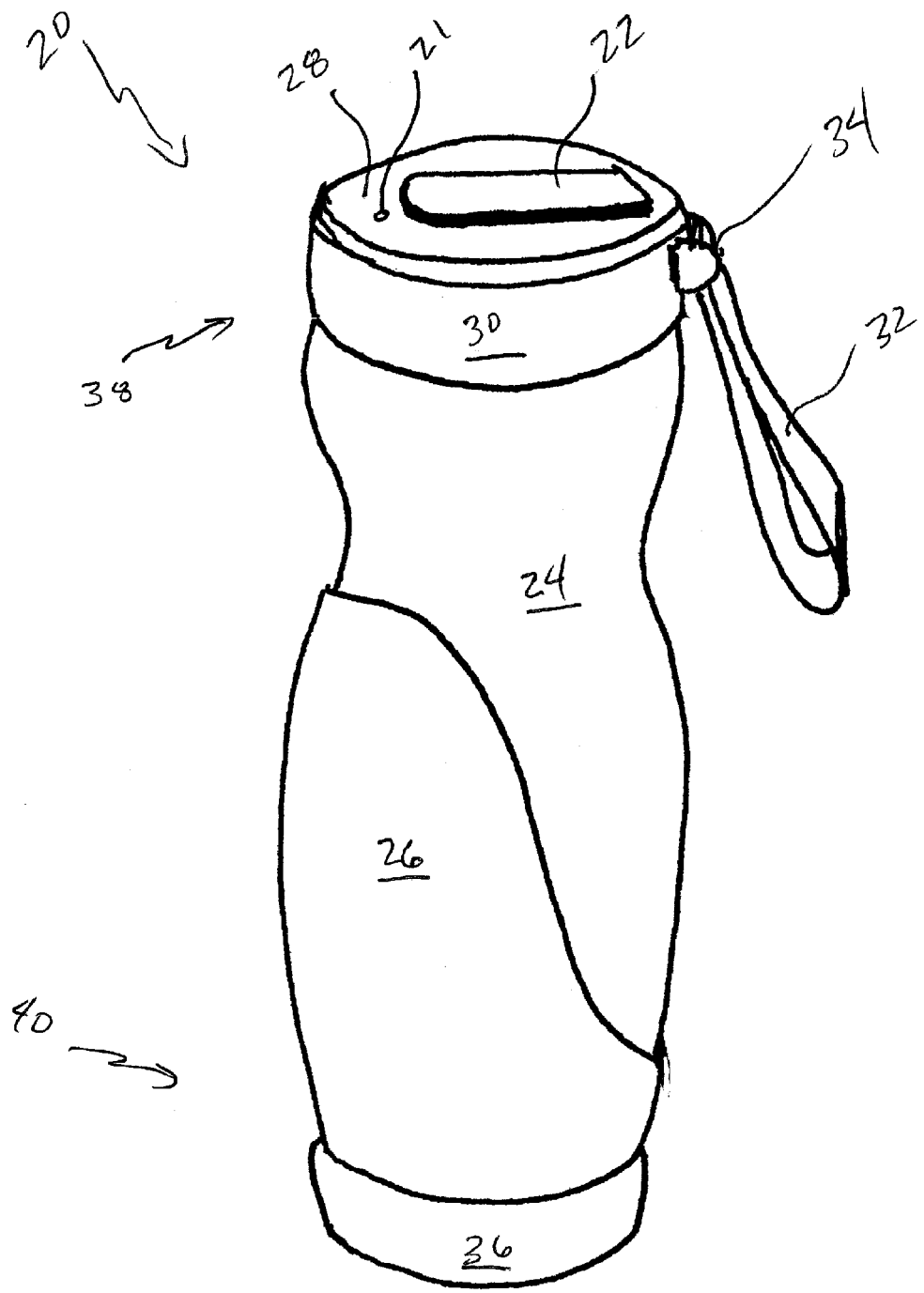
FIG. 3 is a perspective view of a bottle having a closed top valve assembly, according to one embodiment of the invention.
Figure 4:
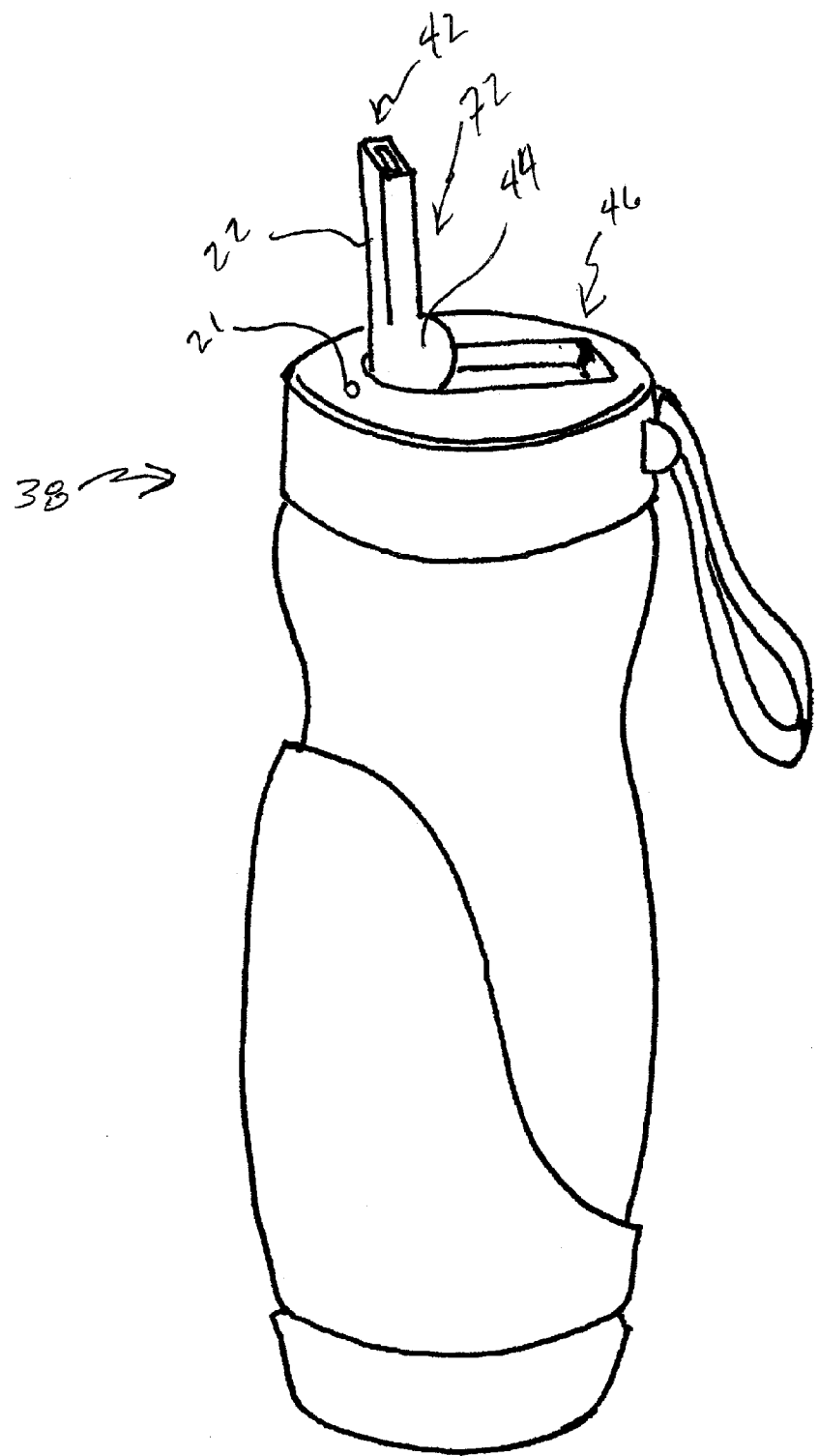
FIG. 4 is a perspective view of a bottle having an open top valve assembly, according to one embodiment of the invention.
Figure 5:
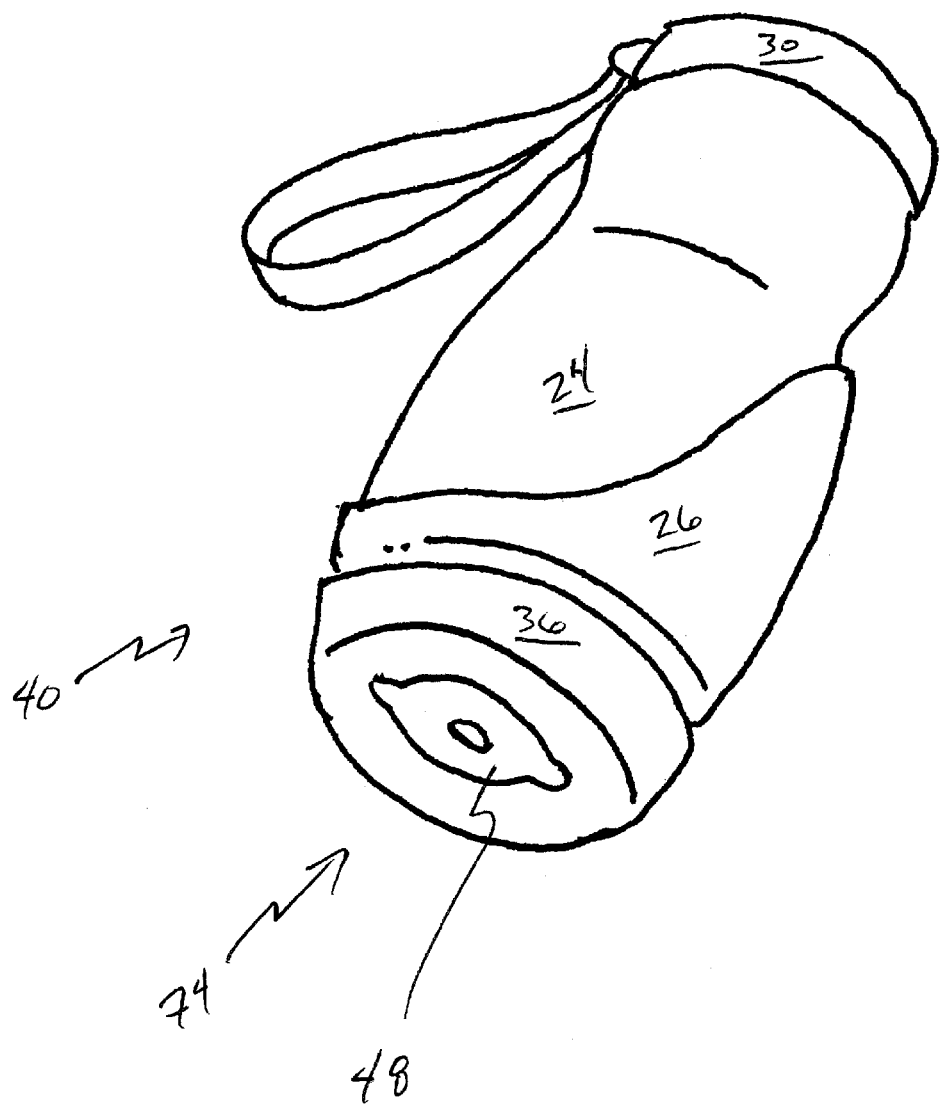
FIG. 5 is a bottom perspective view of a bottle having a closed bottom valve assembly, according to one embodiment of the invention.
Figure 6:
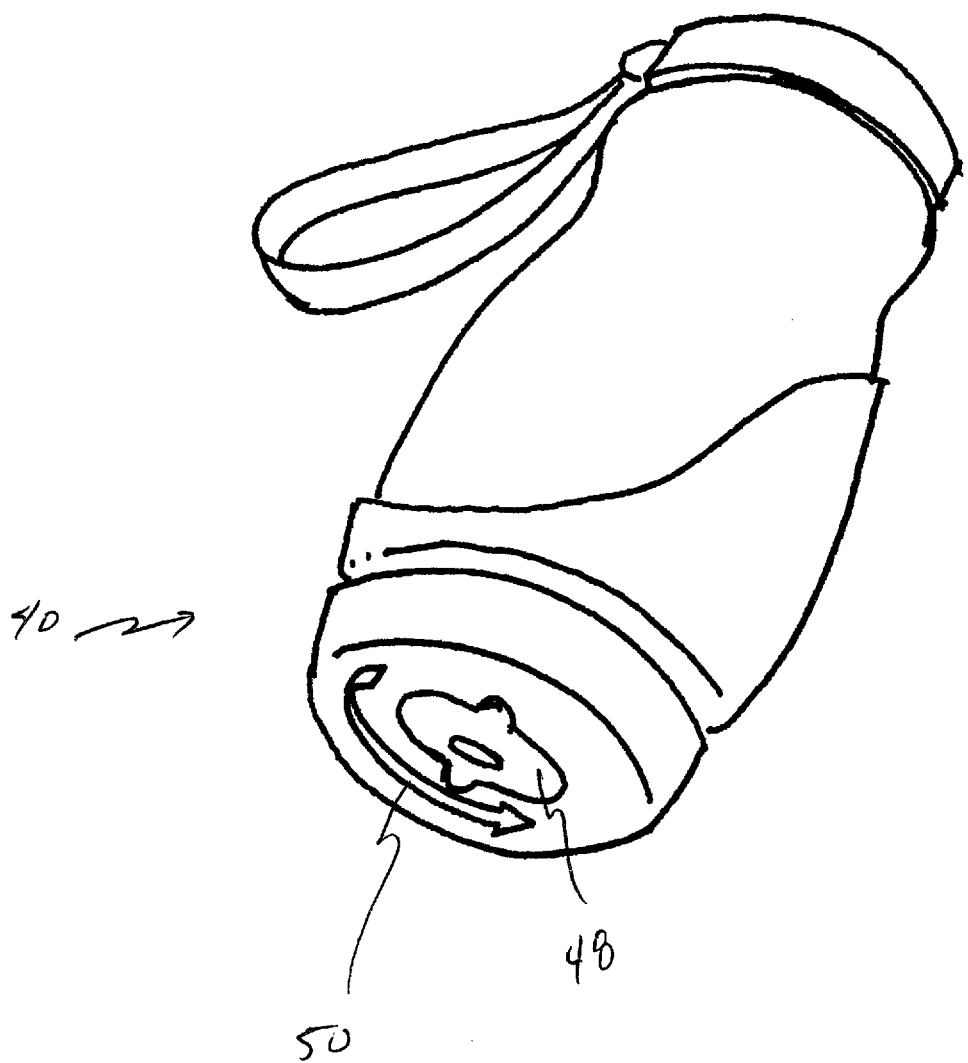
FIG. 6 is a bottom perspective view of a bottle having an open bottom valve assembly, according to one embodiment of the invention.
Figure 7:
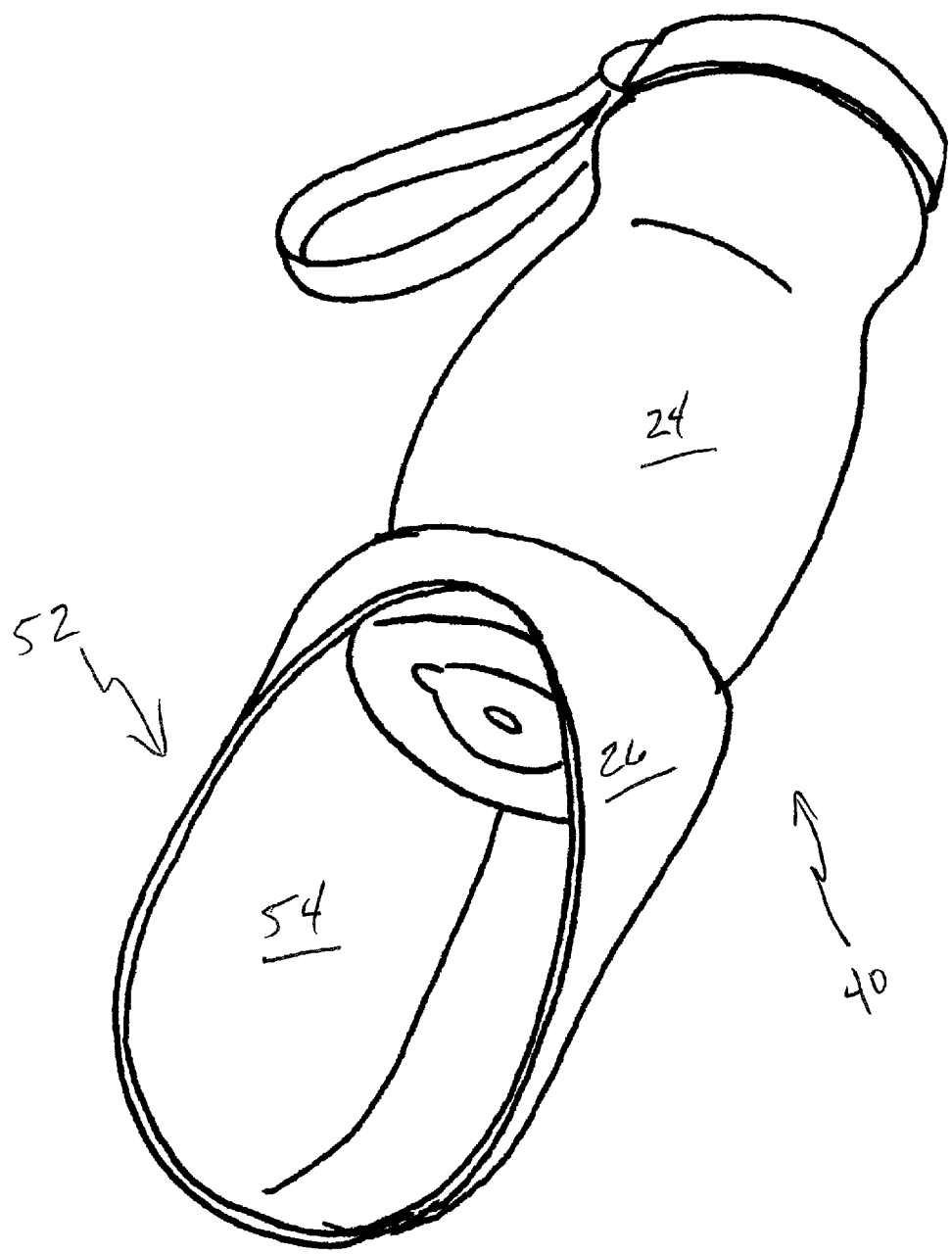
FIG. 7 is a bottom perspective view of a bottle having a deployed flexibly invertible dish, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Looking to FIGS. 1-7, there is a bottle 20 suitable for multi-purpose use, such as but not limited to contemporaneous use by humans (See FIG. 1) and animals (illustrated as a dog, See FIG. 2), while being convenient and sanitary for both. The human drinks from a spigot 22 extending from a top valve assembly 72. The animal drinks from a dish 26 extending from a bottom 40 of the bottle body 24.

The illustrated bottle includes a bottle body 24 having a bottom aperture through a bottom end 40 thereof and a top aperture through a top end 38 thereof opposite the bottom end. Accordingly, the illustrated bottle body forms a hollow cylindrical body when the top and bottom caps are removed. The bottle body is fluid impermeable so that it may contain a fluid (e.g. water, energy drink, juice) for later consumption by a human and/or an animal.

There is a top valve assembly 72 extending through the top end of the bottle body and allowing for selectable dispensing of fluid disposed within the bottle body out therethrough. The illustrated top valve assembly 72 includes a spigot 22 having a channel 42 therethrough through which fluid may flow. The illustrated spigot extends from a ball body 44 that is rotatably coupled to the cap such that the spigot may be rotated to nest within a cavity 46 when in a closed mode (See FIG. 3) and may extend outwardly when in an open mode (See FIG. 4). The illustrated the top valve assembly includes a selectably removable cap 30 that selectably couples to and covers the top aperture. The illustrated top valve assembly includes a one-way air intake valve 21 extending through a top 28 of the cap that permits air to enter the bottle body but not to exit therefrom. The illustrated cap 30 also includes a mounting structure 32 illustrated as a plastic loop that is coupled to the cap by a hinge 34.

There is a bottom valve assembly 74 extending through the bottom end 40 of the bottle body and allowing for selectable dispensing of fluid disposed within the bottle body out therethrough. The illustrated bottom valve assembly includes a selectably removable cap 36 that selectably couples to and covers the bottom aperture. The illustrated bottom valve assembly includes a second multi-position fluid valve 48 that includes a first mode (See FIG. 5) wherein fluid flow therethrough is restricted and a second mode (See FIG. 6) wherein fluid flow through the bottom is permitted. The illustrated second multi-position fluid valve includes a rotating action that when the valve is rotated 50 the valve body rotates about a threaded housing and engages/disengages from a seal, thereby opening/closing the valve.

There is a flexibly invertible dish 26 coupled near the bottom aperture, wherein in a stored mode (See FIGS. 1 and 3) the dish is coupled about an outer surface of the bottle body and in a deployed mode 52 (See FIGS. 2 and 7) the dish is inverted with respect to itself in the stored mode and extends outwardly from the bottom end of the bottle body forming a concave surface 54 within which fluid may be disposed. The flexible invertible dish may be of a soft plastic or rubber material (or other similar suitable material) that is capable of being inverted and of holding a dish-shape when in a deployed mode and capable of containing drinking fluid (e.g. water).

Figure 8:
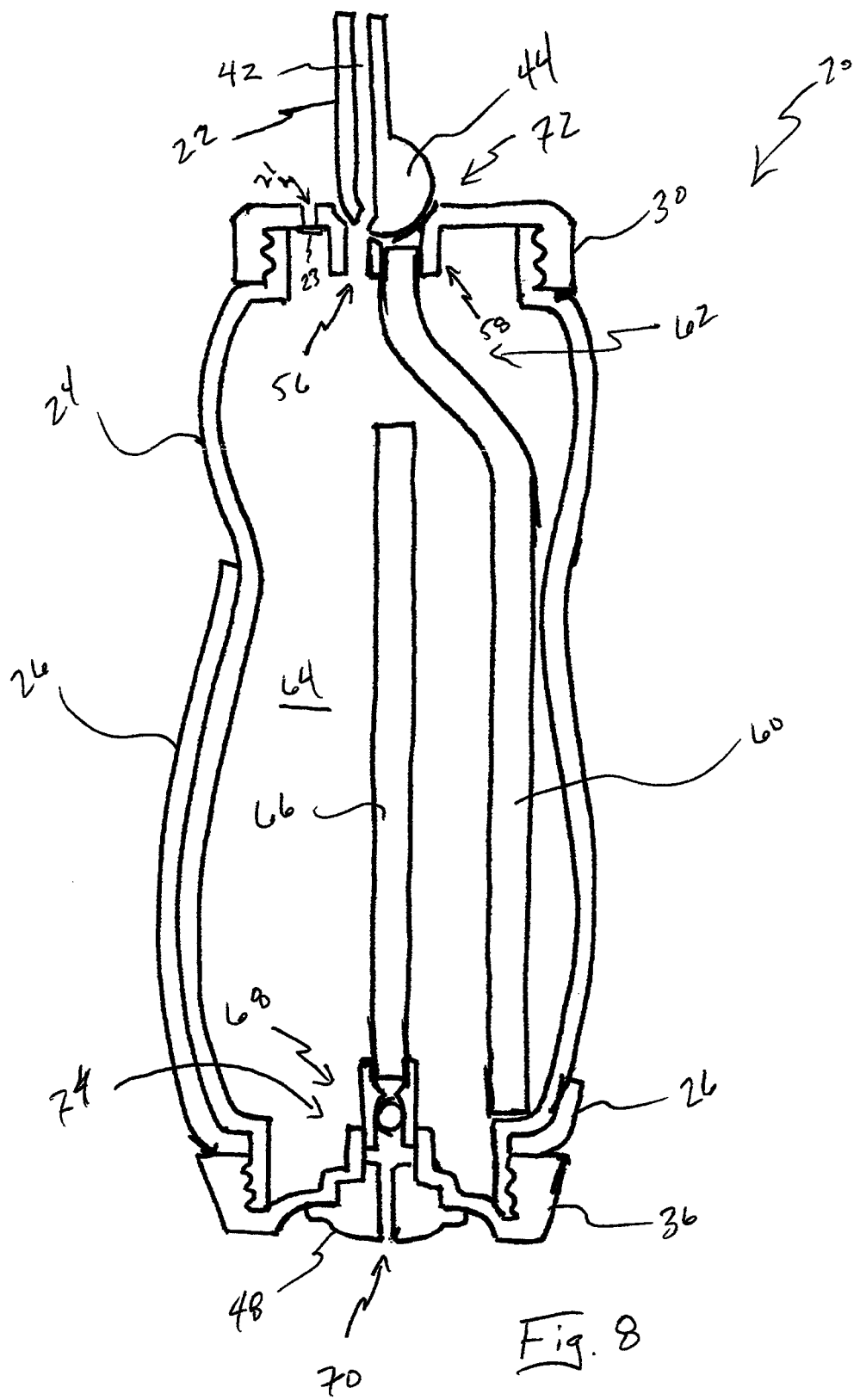
FIG. 8 is a cross-sectional view of a bottle, according to one embodiment of the invention.

Looking to FIG. 8, there is a bottle 20 having a bottle body 24 with a top cap 30 coupled about a top aperture at a top end and a bottom cap 36 coupled about a bottom aperture at a bottom end. There is a flexible invertible dish 26 coupled about the bottle body. There is a top valve assembly 72 and a bottom valve assembly 74 at each end respectively. Wherein the bottle body is of a flexible material, the bottle body may be subject to pressure (e.g. squeezing as by hand), which may thereby increase pressure in an inside of the bottle body and thereby force fluid out through one or more of the valve assemblies.

The top valve assembly 72 includes a spigot 22 having a channel 42 therethrough through which fluid may flow. The illustrated spigot extends from a ball body 44 that is rotatably coupled to the cap such that the spigot may be rotated to nest within a cavity 46 when in a closed mode (See FIG. 3) and may extend outwardly when in an open mode (See FIG. 4). The illustrated the top valve assembly includes a selectably removable cap 30 that selectably couples to and covers the top aperture.

The illustrated top valve assembly includes a one-way air intake valve 21 extending through a top 28 of the cap that permits air to enter the bottle body but not to exit therefrom. The illustrated one-way air intake valve includes an aperture having a diaphragm 23 covering a bottom thereof and affixed thereto that may flex inwardly when pressure outside the bottle is sufficiently greater than that inside the bottle, thereby permitting air to enter but restricting fluid from exiting therefrom. The illustrated top valve assembly includes a first multi-position fluid valve that includes a first mode wherein fluid flow therethrough is restricted and a second mode wherein fluid flow through the top is permitted.

There is a top straw 60 coupled to the top valve assembly at an insert aperture 58 sized to receive the top straw and friction fit thereto. The top straw extends downwardly therefrom in an interior of the bottle body. The illustrated top straw includes an offset, wherein the top straw is bent in a zig-zag pattern so that a major portion thereof extends along a side region of the interior of the bottle body, thus being out of the way of the bottom straw 66 (or out of the way of an inner bladder or other interior structure, See FIG. 9). The illustrated multi-position fluid valve includes a third mode wherein fluid flow through the top straw is permitted. In the illustration, the multi-position fluid valve is in a second mode wherein the channel 42 of the spigot and ball are aligned with a primary cap aperture 56 which gives fluid communication with an interior of the bottle body at a top region thereof. Wherein the spigot and ball are over-rotated beyond that position and the channel 42 is aligned with a secondary cap aperture 58 (aka the insert aperture into which the straw is coupled), access to the primary cap aperture is removed and access to an interior of the bottle body is then through the straw, which opens at a bottom region of the bottle body.

There is a bottom valve assembly 74 extending through the bottom end 40 of the bottle body and allowing for selectable dispensing of fluid disposed within the bottle body out therethrough. The bottom valve assembly includes an open/close valve selector body 48 through which extends a channel 70 through which fluid may flow when the valve is open. The illustrated bottom valve assembly includes a selectably removable cap 36 that selectably couples to and covers the bottom aperture. The illustrated bottom valve assembly includes a second multi-position fluid valve 48 that includes a first mode (See FIG. 5) wherein fluid flow therethrough is restricted and a second mode (See FIG. 6) wherein fluid flow through the bottom is permitted. The illustrated second multi-position fluid valve includes a rotating action that when the valve is rotated 50 the valve body rotates about a threaded housing and engages/disengages from a seal, thereby opening/closing the valve. The illustrated bottom valve assembly includes a back-flow prevention valve 68 which is illustrated as a floating ball check. There is a bottom straw 66 coupled to the bottom valve assembly through a friction fit insert structure. The bottom straw extends upwardly therefrom in an interior of the bottle body to a top region of the bottle body.

Figure 9:
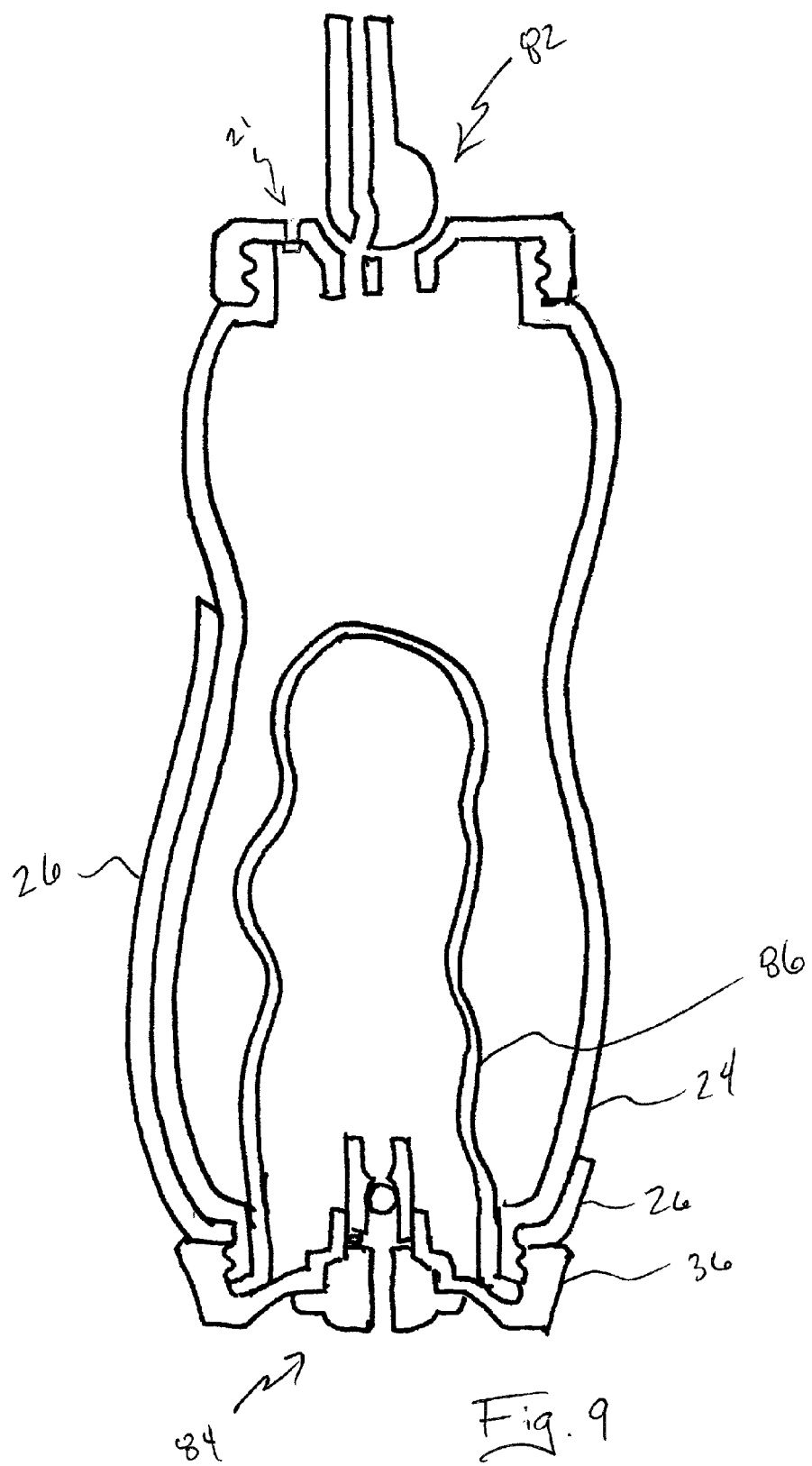
FIG. 9 is a cross-sectional view of a bottle, according to one embodiment of the invention.
Figure 10:
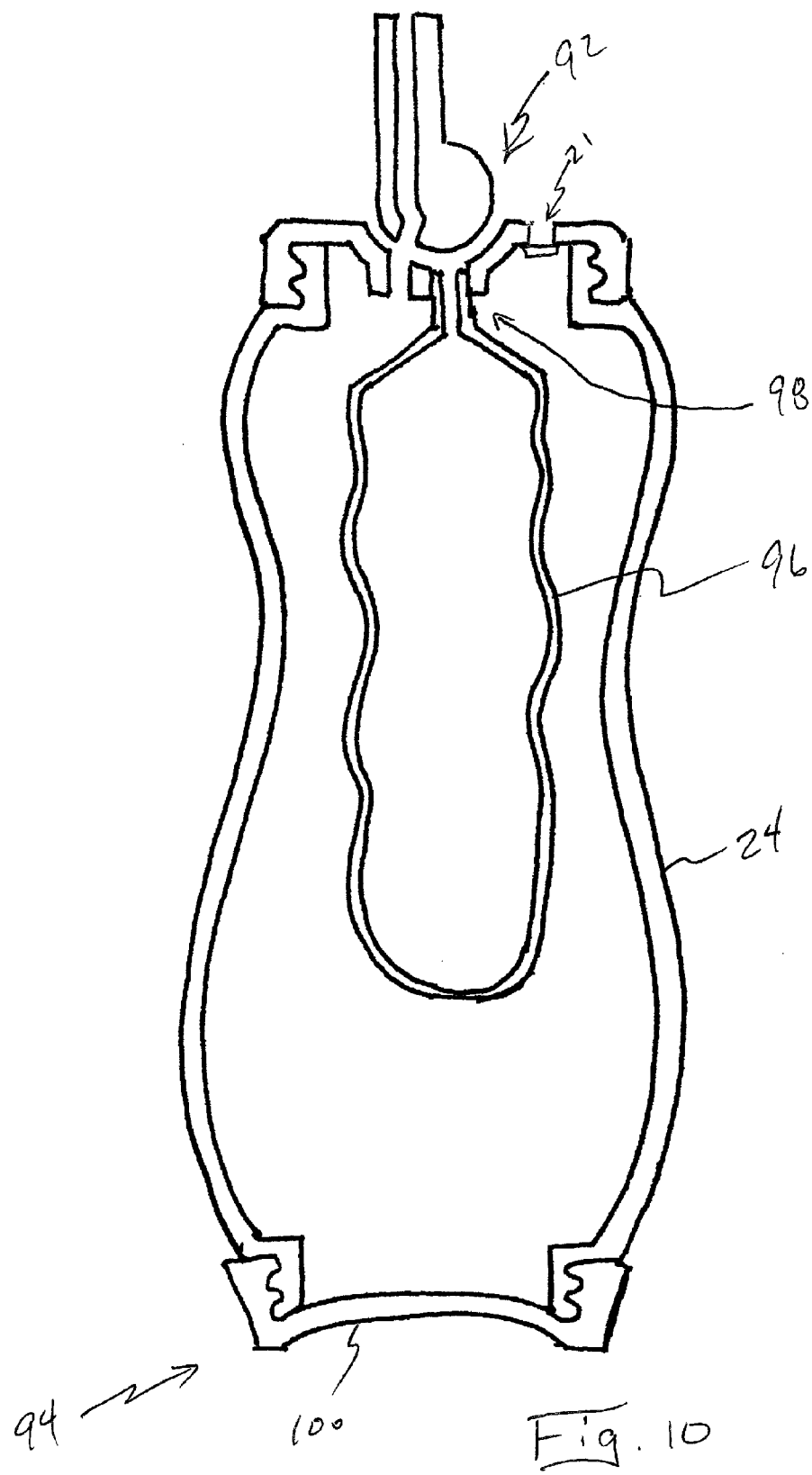
FIG. 10 is a cross-sectional view of a bottle, according to one embodiment of the invention.
Figure 11:
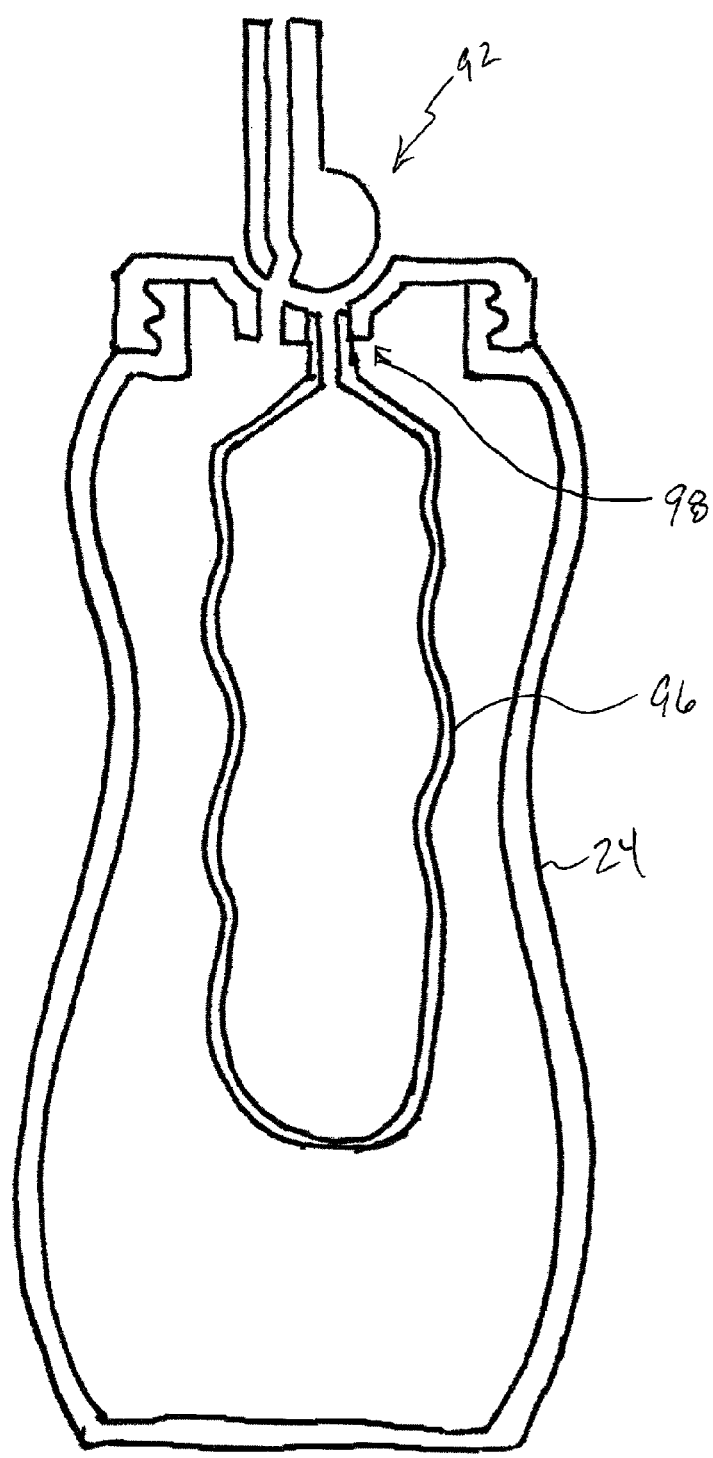
FIG. 11 is a cross-sectional view of a bottle, according to one embodiment of the invention.

Looking to FIGS. 9-11, there are two variations on a bladder insert: one with a bottom bladder (FIG. 9) and one with a top bladder (FIG. 10), and three variations on a bottle bottom: one with valve assembly having a check valve (FIG. 9), one with a simple cap (FIG. 10), and one with a solid bottom (FIG. 11). In each figure there is a bottle, including a bottle body having a top aperture through a top end thereof and a top valve assembly, respectively 82 and 92, extending through the top end of the bottle body and allowing for selectable dispensing of fluid disposed within the bottle body out therethrough. The illustrated valve assemblies each include a multi-position fluid valve that includes a first mode wherein fluid flow therethrough is restricted, a second mode wherein fluid flow through the top is permitted directly to an interior of the bottle body, and a third mode wherein fluid flow is permitted to an interior of the bottle body only through a coupling structure, the coupling structure being the bottom valve assembly 84 in FIG. 9 and the friction insert 98 in FIGS. 10 and 11. There is also shown an inner bladder, 86 and 96 respectively, disposed within the bottle body that forms a fluid-tight seal with the coupling structure. Accordingly, this allows for two completely different fluids to be stored therein without mixing the contents thereof and allowing for selective dispensing of each of the fluids therein. In FIG. 9, the bladder is functionally coupled to the bottom valve assembly between the cap and the bottle body such that fluid dispensed from the bottom valve assembly is withdrawn from the bladder only. In FIGS. 10 and 11, the bladder is functionally coupled to the friction insert of the top valve assembly such that when in the third mode the multi-position fluid valve permits fluid to be withdrawn from the inner bladder only. In FIG. 10, there is a bottom cap covering a bottom aperture of the bottle body.

Figure 12:
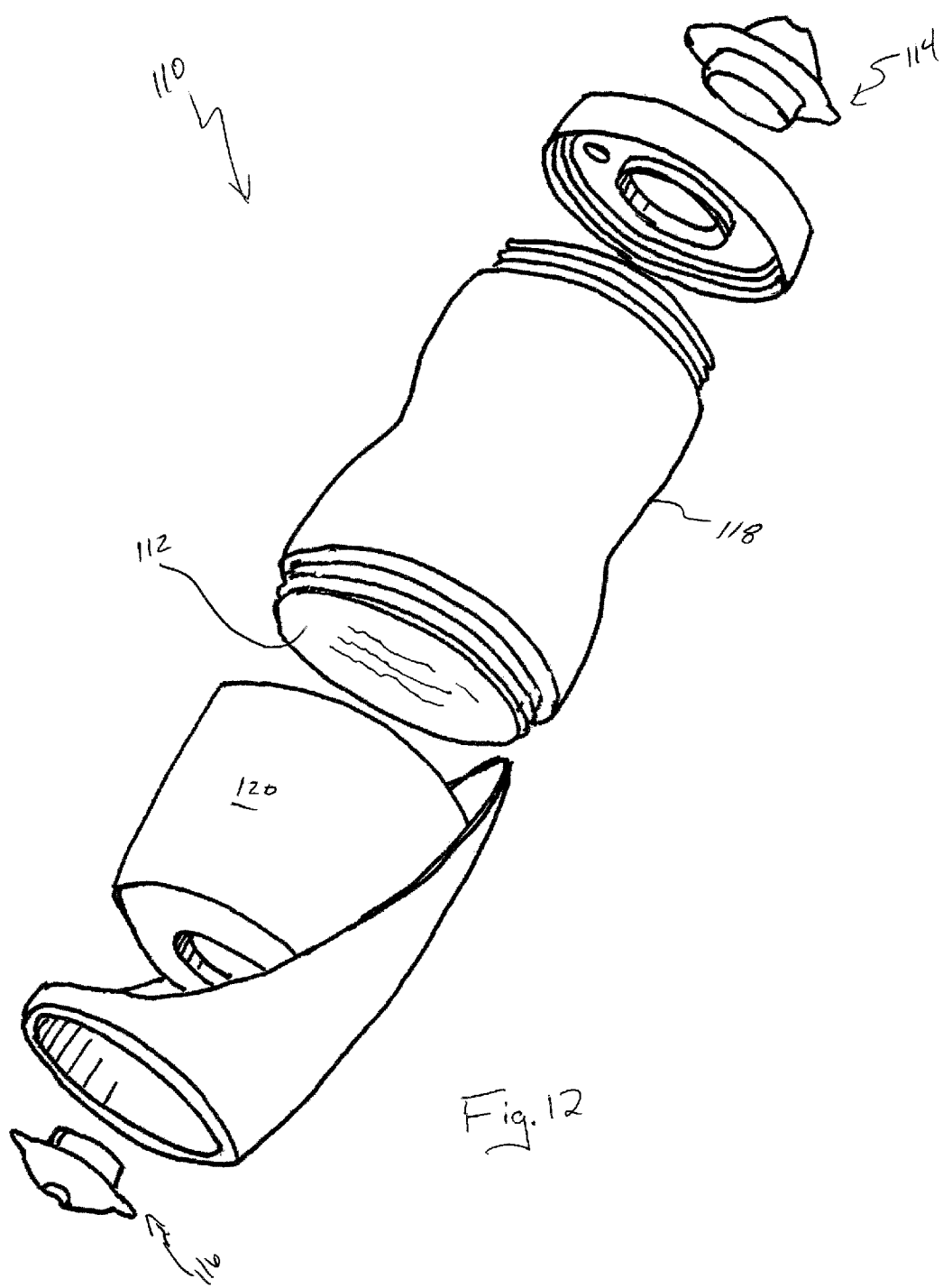
FIGS. 12 and 13 are perspective exploded and elevational cross-sectional views of a bottle having a membrane, according to one embodiment of the invention.
Figure 13:
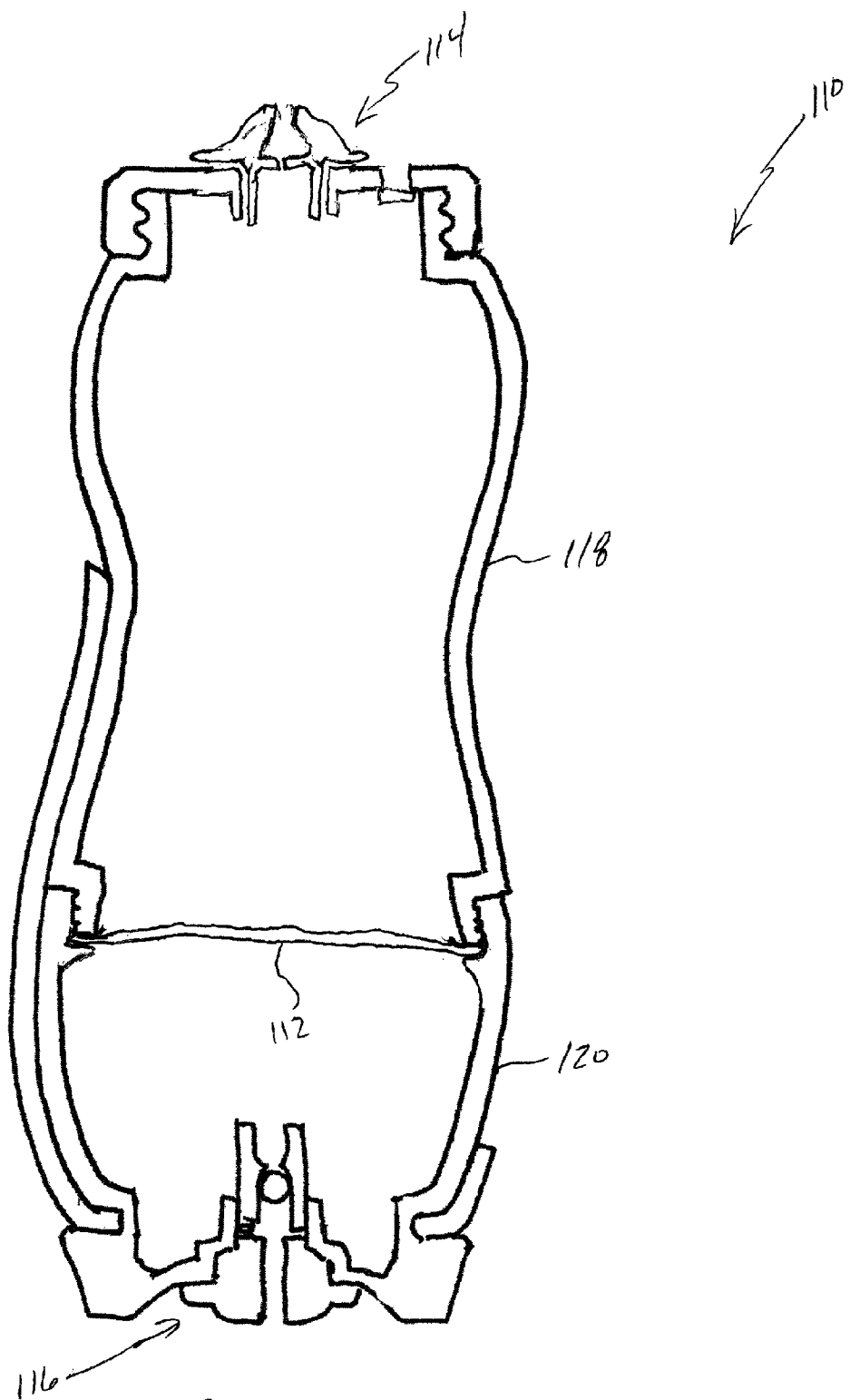

Looking to FIGS. 12 and 13, there is a bottle 110 having a fluid-impermeable membrane 112 disposed within the bottle body that forms a barrier between the top valve assembly 114 and the bottom valve assembly 116 and prevents fluid communication therebetween. The illustrated membrane is coupled between a top portion 118 of the bottle body and a bottom portion 120 of the bottle body that are selectably coupled to each other with the membrane disposed therebetween, thus compartmenting an interior of the bottle body. The illustrated membrane is substantially flat and flexible.

In one non-limiting embodiment, there is a hydration system (e.g. beverage bottle) that allows a human and a pet (e.g. a dog) to both drink out of the same system in a sanitary and convenient manner. In such an embodiment, the human may drink out of a top of the system and the dog may drink out the of the bottom of the system. Such may have a selectably flexible dish that sits flush to a bottle but retracts and/or inverts outward into a dish shape that can receive water directly from a valve at a bottom of the bottle adjacent to the dish when so formed. The bottle may have two separate fluids inside through a bladder disposed therein (e.g. through a bottom aperture and in fluid communication with the bottom valve). It may be that the valve in the bottom is a one-way valve so that the inside of the bottle is not contaminated by the animal during operation. There may be a valve at the top that may be selectably fed from either the top of the bottle or a straw that extends to near a bottom of the bottle. There may be a one-way air valve that may be at a top of the bottle that allows air to enter the bottle when there is a pressure differential between the outside and inside. It may be that the components of such a system are selectably separable from each other such that they may be selectably removed for washing (e.g. in a dish washing machine).

There may be a cylindrical housing (i.e. bottle, or bottle body) having a flexible and/or invertible dish coupled about a bottom aperture of the bottle body and may be between the bottle body and the bottom cap and/or disposed about a bottom region of the bottle body when in a first position and when flipped/changed/inverted to a second position it may extend outwardly from the bottom of the bottle body in a dish-shape (i.e. concave sufficiently to hold a fluid disposed therein). There may be a top cap that may be selectably coupled to a top of the bottle body. There may be a bottom cap that may be selectably coupled to a bottom of the bottle body. There may be a bottom open/close valve that may be disposed through the bottom cap such that fluid flow through the cap may be selectably controlled thereby. There may be a bottom backflow prevention valve in fluid communication between an exterior of the bottom and an interior of the bottle body such that fluid may exit the bottle body but not enter therethrough. There may be a top multi-position fluid valve disposed through the top cap such that fluid communication therethrough may be controlled.

There may be a kit that includes one or more structures, devices, components, and the like thereof described herein. Such a kit may include sufficient components to allow for the assembly of one or more of each of the bottles described in FIGS. 7-11.

In operation, a user may fill a bottle as described herein. The user may take the bottle with them (e.g. on a bike ride with their dog). The user may stop, get the bottle from a storage location (e.g. convenient bike mount for water bottles), and then position the top valve assembly in an open mode and drink therefrom. The user may then close the top valve assembly and then flip the flexible invertible dish into a dish mode, open the bottom valve assembly and then dispense fluid therein into the dish. The user may then allow their pet to drink fluid from the dish without risk of the fluid being contaminated. The user may forget to close the bottom valve assembly, but since fluid is dispensed through the bottom from the top region of the bottle, fluid will advantageously not leak out when the bottle is stored upright in the bottle mount on the bike.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although specific valves are described herein and illustrated, it is understood that the types of valves usable and/or appropriate to the various assemblies described herein are plethoric. Non-limiting examples of other valve/check types which may be used as appropriate include the following valves: ball, butterfly, ceramic disc, check, choke, diaphragm, gate, globe, knife, needle, pinch, piston, plug, poppet, spool, thermal expansion, pressure reducing, sampling, and safety.

Additionally, although the figures illustrate a top valve assembly in all figures, there may be one or more embodiments wherein the top valve assembly is simply a cap.

It is also envisioned that an inner bladder may be shaped other than bag-shaped, such as but not limited to being irregularly shaped, having disparate elongated portions, being flat, and the like and combinations thereof.

Also, there may be one or more embodiments wherein the dish is not flexible and/or invertible but may be rigid and may snap onto the structure in two modes or otherwise couple to the bottle body in two different modes as described herein (e.g. span-on, slide, flip). Additionally, the dish may be coupled to the bottle body in a manner other than that illustrated, such as but not limited to being coupled directly to the bottle body, being integrally formed therewith, being coupled only to the bottom cap, being integral to the bottom cap, and the like and combinations thereof.

Still more, while the illustrated flexible invertible dish is illustrated as being coupled about the bottle body at the end thereof near the bottom aperture, the dish may be coupled about a bottom cap, a bottom valve assembly, and/or about a more central region of the bottle body and still be near the bottom aperture such that it may perform its function.

It is expected that there could be numerous variations of the design of this invention. An example is that the bottle body may be of any enclosed container shape and is not limited to a circular cylinder as illustrated.

There may be a straw guide that couples to one or more of the straws described herein and/or that guides one or more straws described herein.

Finally, it is envisioned that the components of the device may be constructed of a variety of materials, including but not limited to plastics, rubbers, ceramics, metals, woven fibers, natural materials, eco-friendly materials and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A bottle, comprising:
    a) a bottle body having a bottom aperture through a bottom end thereof and a top aperture through a top end thereof opposite the bottom end, the top and bottom apertures providing dual entry points into a same chamber within the bottle body;
    b) a top cap selectably removable over the top aperture;
    c) a dish coupled near the bottom aperture, wherein in a stored mode the dish is coupled about an outer surface of the bottle body and in a deployed mode the dish extends outwardly from the bottom end of the bottle body forming a concave surface within which fluid may be disposed;
    d) a bottom valve assembly coupled to the bottom end of the bottle body, the bottom valve assembly configured to provide a bottom valve for selectable flow through a flow conduit from the chamber of the body to an exterior, the top or bottom end configured to support the bottle in a standing position when the dish is in the stored mode, the bottle having a long axis that extends from or near the top end to a location at or near the bottom end, the long axis being perpendicular to a ground surface.

2. The bottle of claim 1, wherein the bottom valve assembly includes a selectably removable cap that selectably couples to and covers the bottom aperture.

3. The bottle of claim 1, further comprising a one-way air intake valve that permits air to enter the bottle body but not to exit therefrom.

4. The bottle of claim 1, wherein the bottom valve assembly includes a multi-position fluid valve that includes a first mode wherein fluid flow therethrough is restricted and a second mode wherein fluid flow through the bottom aperture is permitted.

5. The bottle of claim 1, further comprising a bottom straw coupled to the bottom valve assembly and extending upwardly therefrom in the chamber of the bottle body.

6. The bottle of claim 1, wherein the top cap includes a valve assembly, allowing for selectable dispensing of fluid disposed within the bottle body out therethrough.

7. The bottle of claim 1, further comprising a fluid-impermeable membrane disposed within the bottle chamber that forms a barrier between the top aperture and the bottom valve assembly and prevents fluid communication therebetween.

8. The bottle of claim 7, wherein the fluid-impermeable membrane is a removable bladder coupled to an aperture and forming a fluid-tight seal therewith.

9. The bottle of claim 6, further comprising a top straw coupled to the top valve assembly and extending downwardly therefrom in the chamber of the bottle body.

10. The bottle of claim 1, wherein the dish is coupled to the bottom valve assembly.

11. The bottle of claim 1, wherein the dish is flexibly invertible.

12. The bottle of claim 1, wherein the dish is slidably attached to the bottle assembly.

13. The bottle of claim 1, wherein the dish is hingedly attached to the bottle assembly.

14. The bottle of claim 1, further comprising a back-flow prevention valve coupled to the bottom valve assembly and configured to prevent backflow into the chamber of the body, the flow conduit of the valve being shared by both the valve assembly and the valve.

15. The bottle of claim 1, wherein the bottom valve assembly is recessed into the chamber of the bottle body.

16. A bottle, comprising:
a) a bottle body having sidewalls that define a chamber and a top aperture through a top end thereof; the top aperture defined by a cylindrical wall configuration;
b) a top valve assembly selectably coupled to the wall configuration and selectably covering the top aperture, the valve assembly including a multi-position valve rotating between a plurality of positions that provide for selectable dispensing of fluid disposed within the chamber of the bottle body out therethrough, the multi-position fluid valve including a first position wherein fluid flow therethrough is restricted; a second position wherein fluid flow through the top is permitted directly from within the bottle body; and a third position wherein fluid flow is permitted from an interior of the bottle body only through a coupling structure; and
c) an inner bladder disposed within the chamber and surrounded by the sidewalls of the chamber, the bladder forming a fluid-tight seal with the coupling structure such that when in the third position the multi-position fluid valve permits fluid to be withdrawn from the inner bladder.

17. The bottle of claim 16, further comprising a bottom cap covering a bottom aperture of the bottle body.

18. The bottle of claim 16, further comprising a back-flow prevention valve being coupled to the top valve assembly.

19. The bottle of claim 16, wherein the top valve assembly includes a selectably removable cap that selectably couples to and covers the top aperture.

20. The bottle of claim 16, further comprising a one-way air intake valve that permits air to enter the bottle body but not to exit therefrom.

* * * * *